United States Patent
Yamada et al.

(10) Patent No.: US 6,221,804 B1
(45) Date of Patent: Apr. 24, 2001

(54) CATALYST FOR PURIFYING EXHAUST GAS AND MANUFACTURING METHOD THEREOF

(75) Inventors: Hiroshi Yamada; Akihide Takami; Hideharu Iwakuni; Makoto Kyogoku; Kenji Okamoto, all of Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/236,621

(22) Filed: Jan. 26, 1999

(30) Foreign Application Priority Data

| Jan. 27, 1998 | (JP) | 10-014053 |
| Jan. 30, 1998 | (JP) | 10-018621 |
| Dec. 25, 1998 | (JP) | 10-368575 |

(51) Int. Cl.⁷ ...................................................... B01J 23/40
(52) U.S. Cl. .......................... 502/326; 502/304; 502/324; 502/328; 502/330; 502/332; 502/338; 502/339; 502/341; 502/344; 502/350; 502/355; 423/239.1; 423/239.2
(58) Field of Search ...................................... 502/328, 339, 502/326, 330, 332, 338, 341, 344, 350, 355, 304, 324; 423/239.1, 239.2

(56) References Cited

U.S. PATENT DOCUMENTS

| 4,171,287 | * | 10/1979 | Keith | 252/462 |
| 4,171,288 | * | 10/1979 | Keith et al. | 252/462 |
| 4,727,052 | | 2/1988 | Wan et al. | |
| 4,738,947 | * | 4/1988 | Wan et al. | 502/304 |
| 4,806,519 | * | 2/1989 | Chiba et al. | 502/252 |
| 5,130,109 | * | 7/1992 | Wan | 423/213.2 |
| 5,139,992 | * | 8/1992 | Tauster et al. | 502/304 |
| 5,196,390 | * | 3/1993 | Tauster et al. | 502/251 |
| 5,490,977 | | 2/1996 | Wan et al. | |
| 5,677,258 | | 10/1997 | Kurokawa et al. | |
| 5,750,082 | * | 5/1998 | Hepburn et al. | 423/213.5 |
| 5,849,660 | * | 12/1998 | Takemoto et al. | 502/327 |
| 5,958,828 | * | 5/2000 | Murakami et al. | 502/333 |
| 6,066,587 | * | 5/2000 | Kurokawa et al. | 502/66 |

FOREIGN PATENT DOCUMENTS

| 197 42 705 A1 | 4/1998 | (DE) . |
| 0 485 180 A1 | 5/1992 | (EP) . |
| 0 507 590 A1 | 10/1992 | (EP) . |
| 0 822 005 A2 | 2/1998 | (EP) . |
| 7-155601 | 6/1995 | (JP) . |
| 9-38493 | 2/1997 | (JP) . |

* cited by examiner

*Primary Examiner*—Steven P. Griffin
*Assistant Examiner*—Cam N. Nguyen
(74) *Attorney, Agent, or Firm*—Nixon Peabody LLP; Donald R. Studebaker

(57) ABSTRACT

An exhaust gas purifying catalyst is provided by coating a slurry of a mixture of a powdered first catalyst provided by carrying Pt on a mixture of alumina and ceria and a powdered second catalyst provided by carrying Rh on manganese oxide on a support member and then impregnating the coated layer with a solution of barium.

11 Claims, 2 Drawing Sheets

CATALYST FOR PURIFYING EXHAUST GAS AND MANUFACTURING METHOD THEREOF

BACKGROUND OF THE INVENTION

1. Field of the Invention

The present invention relates to a catalyst for purifying exhaust gas and manufacturing method thereof.

2. Description of Related Art

Conventional three-way catalysts are not always sufficient to lower a level of NOx in the exhaust and thereby to purify the exhaust gas because of high oxygen concentration of the exhaust gas while an engine operates at lean-burn conditions.

Japanese Unexamined Patent Publication No. 9-38493 discloses a catalyst effective to purify NOx in a high oxygen concentration exhaust gas which comprises a catalytic noble metal and a NOx adsorbent carried in order on a support material of a composite oxide made of alumina combined with lanthanum (La) and/or cobalt (Co). It is said in the publication that while, at high temperatures, alumina reacts with the NOx adsorbent to cause a reduction in its own specific surface area and clogging of its pores, and further to cause sintering of the catalytic noble metal, the composite oxide is prevented from thermal deterioration.

In a manufacturing method of the catalyst, after forming a layer of cobalt alumina complex oxide by impregnating cobalt (Co) into an alumina layer carried on a support and then drying and calcining it, the cobalt-alumina complex oxide layer is impregnated with platinum (Pt) and dried, and is subsequently impregnated with rhodium (Rh), then dried and calcined. Finally, the catalyst is completed by impregnating barium (Ba) into the cobalt-alumina composite oxide layer then drying and calcining it. In the catalyst made by the above method, platinum (Pt) and rhodium (Rh) carried on a single particle of cobalt-alumina composite oxide stay close to or overlap each other.

The catalyst in which two different kinds of noble metal particles are carried on a single particle of support material tends to make an alloy thereof when it is exposed to a high temperature gas, which leads to aggravation of catalytic performance.

SUMMARY OF THE INVENTION

An object of the invention is to provide an improved catalyst having a NOx adsorbent capable of adsorbing NOx in an exhaust gas while the exhaust gas has high oxygen concentration and desorbing NOx into an exhaust gas while the exhaust gas has low oxygen concentration.

Another object of the invention is to provide an improved catalyst containing different kinds of catalytic noble metals for catalyzing reduction of NOx which provides an increased thermal stability of each catalytic noble metal to keep the capability of catalyzing reduction of NOx.

Another object of the invention is to provide a manufacturing method of the improved catalyst.

The foregoing objects of the invention is accomplished by a manufacturing method of a catalyst for purifying an exhaust gas which has a NOx adsorbent capable of adsorbing NOx in the exhaust gas together with two different kinds of catalytic noble metals, namely a first noble metal and a second noble metal, for catalyzing reduction of NOx.

Specifically, the catalyst manufacturing method comprising the steps of forming a powdered first catalyst having the first noble metal carried on a support material but not containing the second noble metal, forming a powdered second catalyst having the second noble metal carried on a support material but not containing the first noble metal, mixing the powdered first catalyst with the powdered second catalyst to produce a mixture, and impregnating a solution of NOx adsorbent into the mixture to carry the NOx adsorbent on the support materials.

The catalyst manufactured by the above method has the first noble metal and the second noble metal on separate support materials, either same or different kinds, which prevents the two noble metals from forming an alloy when the catalyst is exposed to high temperatures. Thus each noble metal cooperates with the NOx adsorbent to catalyze reduction of NOx, thereby purifying the exhaust gas. Furthermore, even when these noble metals cooperate with each other to function as a catalyst, they exhibit sufficiently their own functions. Furthermore, it is a matter of importance of the method in which NOx adsorbent is not separately supported by the catalytic materials but impregnated in the mixture that the NOx adsorbent is partly supported by the support materials such that a particle of the NOx adsorbent is jointly supported by both of a particle of the support material bearing the first noble metal and a particle of the support material bearing the second noble metal, and by both first and second noble metal particles as well. Accordingly, each of the first and second noble metals on a same NOx adsorbent particle cooperates with the NOx adsorbent particle to help the catalyst to lower the level of NOx in the exhaust gas with an effect of causing the catalyst to easily increase its NOx purification efficiency. In particular, in the case where the first and second noble metals play different NOx purifying actions, both first and second noble metal particles achieve their roles on a same NOx adsorbent particle, which is advantageous to NOx purification through the mediation of NOx adsorbent. Further, the second noble metal makes up a reduction in NOx purification efficiency due to sintering of the first noble metal.

An exhaust gas purifying catalyst is obtained by coating the catalyst on a substrate to form a catalyst layer there on. The catalyst layer has a mixture of the support material bearing the first noble metal and the NOx adsorbent but not containing the second noble metal and the support material bearing the second noble metal and the NOx adsorbent but not containing the first noble metal. In the mixture, a part of the NOx adsorbent is jointly supported by both support materials bearing the first and second noble metals, respectively. As the support material for the first noble metal and/or the second noble metal, aluminum oxide ($Al_2O_3$), ceria ($CeO_2$) or at least one of oxides of manganese (Mn), cobalt (Co), titanium (Ti) and iron (Fe) may be used. The first and second noble metals are carried separately on support materials which may be either of the same kind or of different kinds. The exhaust gas purifying catalyst keeps high NOx purification efficiency even after it has been exposed to a high temperature exhaust gas.

Carrying the first and second noble metals on different kinds of support materials separately provides improved catalytic performance. Generally, it can be said that the thermal resistance of a catalyst depends on the thermal stability of support material of the catalyst and that the support material having high thermal stability usually has small specific surface area. It also can be said that, in the case of using two different kinds of noble metals, the amount of one noble metal can often be smaller than that of the other. In this case, a reduction in catalytic performance of the catalyst due to thermal deterioration is prevented by bearing the first noble metal on the first support material with a greater specific surface area whose first noble metal content per unit mass of the support material may be high and bearing the second noble metal on the second support material with a smaller specific surface but with a high thermal stability whose noble metal content may be low. This is because the required amount of the second noble metal is kept even if the first noble metal on the first support material is partly lost or buried in the first support material due to sintering of the first support material. Bearing the second noble metal which may be small in amount on a support material having a large specific area but a low thermal resistance together with the first noble metal prevents significant aggravation of catalytic performance due to a reduction in the amount of the second noble metal caused through sintering of the support material.

It was found by the inventor of this invention, for example, that Pt had high NOx purification efficiency at high oxygen concentration of the exhaust gas and showed a tendency to lower its NOx purification efficiency at low oxygen concentration of the exhaust gas and that using a small amount of Rh together with Pt was effective on restraining lowering the NOx purification efficiency. From the fact, it was concluded that an improved catalyst could be obtained by bearing Pt as the first noble metal on the first support material having a large specific surface area and Rh as the second noble metal which may be small in amount on the second support material with a small specific surface area but with high thermal stability. In the catalyst, when the oxygen concentration of the exhaust gas is high, which indicates that the fuel mixture is lean, NO in the exhaust gas is oxidized to $NO_2$ by means of Pt to become easily adsorbed to the NOx adsorbent. When the oxygen concentration of the exhaust gas is lowered or, in other words, when a stoichiometric air-to-fuel ratio or an air-fuel ratio smaller than the stoichiometric air-to-fuel ratio is provided, Pt and Rh catalyzes reduction of NOx desorbed from the NOx adsorbent. In this catalyzing mechanism, it is considered that Pt has NOx purification efficiency for low oxygen concentration of the exhaust gas higher than Rh. Accordingly, in the catalyst which contains a NOx adsorbent particle jointly supported by both Pt bearing support material particle and Rh bearing support material particle, when the NOx oxidized by Pt and adsorbed by the NOx adsorbent while the oxygen concentration of the exhaust gas is high is desorbed, the NOx is reduced and purified mainly by Rh with high efficiency.

Either $Al_2O_3$ or $CeO_2$, alone or in combination, may be used for the first support material. On the other hand, at least one kind of metal oxide selected from the group including oxides of Mn, Co, Ti and Fe is suitably used as the second support material. Mn and Co among them have higher performance for NOx purification than the remaining ones. As for $Al_2O_3$, γ-alumina is recommended. $CeO_2$ capable of absorbing oxygen ($O_2$ storage effect) is helpful to make the catalyst function as a three-way catalyst so as to purify hydrocarbons (HC) and carbon monoxide (CO) as well as NOx while the engine is operated with around a stoichiometric air-to-fuel ratio (λ=1). Oxides of a metal such as Mn is helpful not only to prevent the first support material from sintering by means of its high thermal stability but also to increase the NOx adsorption capability of NOx adsorbent by means of its function of converting NO in the exhaust gas into $NO_2$.

In the step of impregnating the mixture with a solution of NOx adsorbent, it is preferred to impregnate the mixture with a solution of the first noble metal as well to bear the first noble metal additionally on the support material. That is, the first noble metal is partly supported through impregnation on the support material with the remaining part of the first noble metal pre-supported thereon. This provides an increase in thermal resistance of the catalyst and improves its NOx purification efficiency while the catalyst is still fresh or when the air-to-fuel ratio is stoichiometric. The increase in thermal resistance is provided by improved dispersion of the first noble metal partly pre-supported by the support material with an effect of preventing sintering of the first noble metal itself and sintering between the first and second noble metals while the catalyst is exposed to a high temperature exhaust gas. The improvement of NOx purification efficiency is provided by significantly enhanced cooperation the NOx adsorbent with the first and second noble metals due to close disposition of the remaining part of the first noble metal as well as the NOx adsorbent to the second noble metal.

At least one of metals selected from the group including alkaline metals such as sodium (Na), alkali earth metals such as barium (Ba) and strontium (Sr) and rare earth metals such as lanthanum (La) is suitably used as the NOx adsorbent. Especially Ba has an excellent capability of NOx adsorption.

It was also found by the inventor of this application that a double layered catalyst comprising an inner catalyst layer formed on a substrate which contained a NOx adsorbent and a catalytic noble metal for catalyzing reduction of NOx and an outer catalyst layer formed over the inner zeolite layer with a noble metal borne thereon provided improved the performance of NOx purification of the catalyst.

A manufacturing method of the double layered catalyst includes the steps of preparing a powdered first catalyst having Pt carried on a mixture of $Al_2O_3$ and $CeO_2$, preparing a powdered second catalyst having Rh carried on a metal oxide of at least one kind of metal selected from the group including Mn, Co, Ti and Fe, preparing a powdered third catalyst having Pt and Rh carried on zeolite, forming an inner layer of a mixture of the powdered first and second catalysts on a substrate, forming an outer layer of the powdered third catalyst over the inner layer; and then impregnating a solution of NOx adsorbent, which comprises at least one kind of metal selected from the group consisting of alkaline metals, alkali earth metals and rare earth metals, into the inner and outer layers to have the NOx adsorbent carried on the inner and outer layers. Impregnating a mixture of a NOx adsorbent solution and a noble metal solution into the inner and outer layers may be made for improved dispersion of the NOx adsorbent and the noble metal.

The exhaust gas purifying catalyst made by the above method has double layers including the inner and outer catalyst layers formed on a substrate. The inner catalyst layer comprises a mixture of a catalytic component containing Pt and NOx adsorbent carried on a mixture of $Al_2O_3$ and $CeO_2$, but not containing Rh and a catalytic component containing Rh and NOx adsorbent carried on a metal oxide of at least one kind of metal selected from the group including Mn, Co, Ti and Fe but not containing Pt. The outer catalyst layer comprises a catalytic component containing PT, Rh and NOx adsorbent carried on zeolite.

In the double layered catalyst, on top of the effect as set forth that the catalyst containing Pt and Rh separately supported by $Al_2O_3$ and a metal oxide such as Mn in the inner catalyst layer cause the catalyst to work with high NOx purification efficiency even after exposure to high temperature exhaust gases, the noble metal carried on zeolite in the outer catalyst layer activates NOx and HC in the exhaust gas and in consequence improves the NOx purifying efficiency.

Specifically, NO in the exhaust gas is converted to $NO_2$ to become easier to be adsorbed by the NOx adsorbent and HC becomes energetically reactive due to partial oxidization and cracking. The activated HC promotes reducing reaction of NOx.

As apparent from the above explanation, since the effectiveness of using a metal oxide such as Mn as the support material for the second noble metal is considered to come from converting NO in the exhaust gas to $NO_2$, it is understood that the exhaust gas purifying catalyst having a catalytic layer formed on a substrate which comprises a mixture of the powdered catalyst containing the first noble metal borne by the support material such as $Al_2O_3$ but not containing the second noble metal and the powdered catalyst containing the second noble metal and NOx adsorbent borne by a metal oxide as a support material capable of oxidizing NO to $NO_2$ but not containing the first noble metal is effective to catalyze reduction of NOx in the high oxygen concentration exhaust gas with high efficiency even after exposed to high temperatures.

As described above, the catalyst according to the invention prevents the noble metals from forming an alloy due to exposure to high temperatures and causes the noble metals to catalyze reduction of NOx through cooperation with the NOx adsorbent. Because the NOx adsorbent is partly supported by the support materials such that the NOx adsorbent particle is jointly supported by both of a particle of the support material bearing the first noble metal and a particle of the support material bearing the second noble metal, and by both first and second noble metal particles as well, the first and second noble metals respectively cooperate with the NOx adsorbent on each NOx adsorbent particle, so as to contribute to purification of NOx in the exhaust gas with an effect of causing the catalyst to easily increase its NOx purification efficiency.

When using different kinds of support materials for the first and second noble metals, it is easy to make the best use of advantages of the respective support materials for improving the thermal resistance and an increase in NOx purification efficiency of the catalyst by bearing noble metals suitable for the support materials, respectively, on the respective support materials. For example, by bearing Pt which is required to be relatively large in amount on $Al_2O_3$ and bearing Rh which may be relatively small in amount on a metal oxide such as Mn, the performance of the NOx adsorbent is improved by the metal oxide with keeping improved dispersion of Pt and Rh. Furthermore, since the metal oxide such as Mn does not bear on sintering, the thermal stability of Rh borne by the metal oxide is improved, so as to contribute to purification of NOx in the exhaust gas with an effect of causing the catalyst to easily increase its NOx purification efficiency.

BRIEF DESCRIPTION OF THE DRAWINGS

The above and other objects and features of the invention will be apparent from the following description of embodiments thereof when considering in conjunction with the accompanying drawings, in which.

DETAILED DESCRIPTION OF THE EMBODIMENTS OF THE INVENTION

Figure 1:
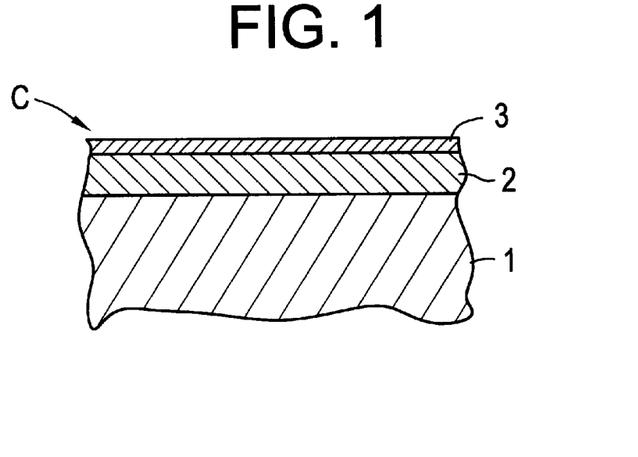
FIG. 1 is a fragmentary sectional view of a catalyst in accordance with an embodiment of the invention.

FIG. 1 shows an exhaust gas purifying catalyst C in accordance with an embodiment of the invention. The catalyst C is placed in an exhaust line (not shown) connected to a lean-burn engine for an automobile to lower emission levels of HC, CO and NOx in the exhaust gas from the engine while operating with a stoichiometric air-to-fuel ratio and further to effectively lower an emission level of NOx in the exhaust gas from the engine while operating under lean burn conditions. That is, the catalyst C has a lean NOx purification effect. Under the lean-burn condition, the oxygen concentration of an exhaust gas is about 4 or 5 to 20% and the air-to-fuel ratio is 18 or higher. The catalyst C comprises a catalyst inner layer 2 formed on a honeycomb support 1 made of cordierite and a catalyst outer layer 3 formed over the catalyst inner layer 2. The catalyst inner layer 2 comprises a mixture of a catalytic component containing a first noble metal such as Pt and NOx adsorbent borne by a first support material, e.g. a mixture of $Al_2O_3$ and $CeO_2$ and a catalytic component containing a second noble metal such as Rh and NOx adsorbent borne by a second support material, e.g. at least one kind of metal oxide selected from the group including Mn, Co, Ti and Fe. The first support material does not bear any second noble metal, and the second support material does not bear any first noble metal. The NOx adsorbent is partly supported by the support materials such that a particle of the NOx adsorbent is jointly supported by both of a particle of the first support material and a particle of the second support material, and by both first and second noble metal particles as well. The catalyst outer layer 3 comprises a catalytic component containing noble metals such as Pt and Rh and NOx adsorbent borne by a third support material, e.g. zeolite. A noble metal such as iridium (Ir) and palladium (Pd) may also be borne together with the previously mentioned noble metals by each support material. Although Ba is usually used as the NOx adsorbent, any one of, or any combination of two of, alkali earth metals, alkaline metals and rare earth metals may be used in place of Ba. As the cerium component, ceria is used as $CeO_2$ and a composite oxide of cerium and zirconium may be used to have high thermal resistance. Each of the catalyst inner layer 2 and the catalyst outer layer 3 contains impurities less than 1%.

The exhaust gas purifying catalyst C is manufactured by the following processes.

A powdered first catalyst is formed by bearing the first noble metal on the first support material through, for example, a drying-solidifying process. A powdered second catalyst is formed by bearing the second noble metal on the second support material through a drying-solidifying process. A powdered third catalyst is formed by bearing the third noble metal on the third support material. The powdered first and second catalysts and binder are mixed with water all together to form a slurry. The mixture slurry is wash-coated on the honeycomb member 1 and dried and calcined to form an inner coating layer. The powdered third catalyst and binder are mixed with water all together to form a slurry. The mixture slurry is wash-coated over the inner coating layer on the honeycomb member 1 to form an outer coating layer and then dried and calcined. Subsequently, the inner and outer coating layers are impregnated with a solution of NOx adsorbent to bear the NOx adsorbent thereon and then dried and calcined.

In order to evaluate the performance of the catalysts in accordance with various examples of the invention, exemplified sample catalysts (EX) of the invention and a comparative catalyst (CX) were prepared for evaluation.

EXAMPLE I

A Pt-contained powdered catalyst (a powdered first catalyst) was prepared by the following process. A mixture of γ-alumina and a $CeO_2$—$ZrO_2$ composite oxide at a weight ratio of 1:1 was prepared and was further mixed with a Pt-dinitro-diamine solution to provide a slurry. The mixture slurry was comprised of the mixture and Pt with a weight ratio of 150:1. The Pt-contained powdered catalyst was prepared by spraying and drying the mixture slurry and then further drying and calcining it. In this instance, the Pt-contained powdered catalyst was dried for one hour at 100 to 200° C. and calcined for two hours at 500 to 600° C. These drying and calcining conditions were also applied to other powdered catalysts of the catalyst EX-I and powdered catalysts of EX-II through EX-IIV and the comparative catalyst CX which will be described later. A Rh-contained powdered catalyst (a powdered second catalyst) was prepared by the following process. A mixture of $MnO_2$ and a rhodium nitrate solution was prepared as a slurry containing $MnO_2$ and Rh at a weight ratio of 120:1. A Rh-contained powdered catalyst was prepared by spraying and drying the mixture slurry and then further drying and calcining it. A Pt and Rh-contained/MFI powdered catalyst (a powdered third catalyst) was prepared by the following process. A Pt-dinitro-diamine solution and a rhodium nitrate solution were mixed to prepare a mixed solution containing Pt and Rh at a weight ratio of 75:1. MFI type zeolite ($SiO_2/Al_2O_3$= 80) was added to the mixed solution to provide a mixture slurry. A Pt—Rh contained/MFI powdered catalyst was prepared by spraying and drying the mixture slurry and then further drying and calcining it.

The Pt-contained powdered catalyst, the Rh-contained powdered catalyst and alumina binder were mixed all together at a weight ratio of 50:2:5 to provide a catalyst mixture. Ion-exchanged water was added to the catalyst mixture to provide a catalyst mixture slurry. A honeycomb substrate 1, which had a weight of 420 gram per liter (g/L), was dipped in the catalyst mixture slurry, and then withdrawn and dried after blowing off an excess of the catalyst mixture slurry and further calcined to form an inner coating layer as an catalyst inner layer 2 on the honeycomb substrate 1. In this instance, the wash-coating was controlled such that the coated and dried catalyst mixture was 342 gram per liter of the honeycomb substrate 1 (342 g/L). Thereafter, the Pt and Rh-contained/MFI powdered catalyst and alumina binder were mixed together at a weight ratio of 5:1 to provide a catalyst mixture. Ion-exchanged water was added to the catalyst mixture to provide a catalyst mixture slurry. The catalyst mixture slurry was wash-coated over the inner coating layer on the honeycomb substrate 1, and then dried and calcined to form an outer coating layer as a catalyst outer layer 3. The wash-coating coating was controlled such that the coated and dried catalyst mixture was 24 g/L. Finally, the catalyst inner and outer layers were impregnated with a barium acetate solution such that they contained 30 g/L Ba, and then dried and cacined to complete a sample catalyst EX-I.

As summarized in Table I, the sample catalyst EX-I is featured by that Pt and Rh were separately carried on different support materials in the catalyst inner layer and a manganese oxide was used as the support material for Rh.

The catalyst inner layer comprises 150 g/L γ-alumina, 150 g/L $CeO_2$—$ZrO_2$ composite oxide and 12 g/L $MnO_2$ L as support materials, 30 g/L binder, and 2 g/L Pt and 0.1 g/L Rh as noble metals. The catalyst outer layer comprises 20 g/L MFI as a support material, 4 g/L binder, and 0.5 g/L Pt and 0.006 g/L Rh as noble metals. A total amount of 30 g/L Ba was carried as a NOx adsorbent on both catalyst inner and outer layers.

EXAMPLE II

A sample catalyst EX-II was similar to the sample catalyst EX-I excepting that $MnO_2$ was replaced with $Co_2O_3$ for bearing Rh as summarized in Table I.

EXAMPLE III

A sample catalyst EX-III was prepared by the following process.

A mixture of γ-alumina, $CeO_2$—$ZrO_2$ composite oxide and $MnO_2$ at a weight ratio of 25:25:2 was prepared. The mixture was further mixed with a Pt-dinitro-diamine solution to prepare a catalyst mixture slurry such that the catalyst mixture was comprised of the mixture and Pt with a weight ratio of 75:1 and was finished to provide a Pt-contained powdered catalyst as a powered first catalyst through the same process as that of the sample catalyst EX-I. Separately, a mixture of γ-alumina, $CeO_2$—$ZrO_2$ composite oxide and $MnO_2$ at a weight ratio of 25:25:2 was prepared. The mixture was further mixed with a rhodium nitrate solution to provide a mixture slurry such that the mixture slurry was comprised of the mixture and Rh with a weight ratio of 1500:1 and finished to provide a Rh-contained powdered catalyst as a powdered second catalyst through the same process as that of the sample catalyst EX-I. A Pt and Rh-contained/MFI powdered catalyst was provided as a powdered third catalyst through the same process as that of the sample catalyst EX-I.

The Pt-contained powdered catalyst, the Rh-contained powdered catalyst and alumina binder were mixed all together at a weight ratio of 5:5:1 to provide a catalyst mixture. Ion-exchanged water was added to the catalyst mixture to prepare s catalyst mixture a slurry. Through the wash-coating applied to the sample catalyst EX-I, an inner coating layer was formed as a catalyst inner layer 2 on a honeycomb substrate 1. The wash-coating was controlled such that the coated and dried catalyst mixture was 330 g/L. The same coating layer as those of the previous sample catalysts EX-I and EX-II was formed as a catalyst outer layer 3 over the catalyst inner layer 2 such that coated and dried catalyst mixture was 24 g/L. Thereafter, the catalyst inner and outer layers 2 and 3 were impregnated with Ba such that they contained 30 g/L Ba to complete a sample catalyst EX-III.

As summarized in Table I, the sample catalyst EX-III differs from sample catalyst EX-I in that the support material bearing Rh in the catalyst inner layer 2 was not manganese oxide but included the same ones as used for bearing Pt and both support materials for Rh and Pt were made of a mixture of γ-alumina, $CeO_2$—$ZrO_2$ composite oxide and $MnO_2$. All other conditions were the same as for sample catalyst EX-I.

EXAMPLE IV

A mixture of γ-alumina and $CeO_2$—$ZrO_2$ composite oxide at a weight ratio of 1:1 was prepared. The mixture was further mixed with a Pt-dinitro-diamine solution to provide a mixture slurry such that the mixture slurry contained the mixture and Pt with a weight ratio of 75:1. A Pt-contained powdered catalyst was prepared as a powdered first catalyst by drying and calcining the mixture slurry through the same process as that of sample catalyst EX-I. Separately, a mixture of γ-alumina and $CeO_2$—$ZrO_2$ composite oxide at a weight ratio of 1:1 was prepared. The mixture was further mixed with a rhodium nitrate solution to provide a mixture slurry such that the mixture slurry contained the mixture and Rh metal with a weight ratio of 1500:1. A Rh-contained powdered catalyst was prepared as a powdered second catalyst by drying and calcining the mixture slurry through the same process as that of sample catalyst EX-I. A Pt and Rh-contained/MFI powdered catalyst was prepared as a powdered third catalyst in exactly the same process as that of sample catalyst EX-I.

A mixture of the Pt-contained powdered catalyst, the Rh-contained powdered catalyst and alumina binder at a weight ratio of 5:5:1 was prepared. Ion-exchanged water was added to the mixture to provide a catalyst mixture slurry. The catalyst mixture slurry was wash-coated as a catalyst inner layer 2 on a honeycomb substrate 1 through the same process as that of sample catalyst EX-I such that the coated and dried catalyst mixture was 330 g/L. A catalyst outer layer 3 was formed through the same process as that of sample catalyst EX-I such that the coated and dried catalyst mixture was 24 g/L. The catalyst inner and outer layers 2 and 3 was subsequently impregnated with Ba to complete a sample catalyst EX-IV through the same process as sample catalyst EX-I.

As summarized in Table I, the sample catalyst EX-IV differs from sample catalyst EX-I in that the support materials for Rh in the catalyst inner layer 2 did not include manganese oxide but was comprised of the same materials as used for Pt. All other conditions were the same as the sample catalyst EX-I.

Comparative Catalyst CX

A mixture of γ-alumina, a $CeO_2$—$ZrO_2$ composite oxide and alumina binder at a weight ratio of 5:5:1 was prepared and added by Ion-exchanged water to provide a catalyst mixture slurry. The mixture slurry was wash-coated on a honeycomb substrate 1 and subsequently dried and calcined to form a catalyst mixture coating layer. The wash coating was controlled such that the dried catalyst mixture was 330 g/L. The catalyst mixture coating layer was further impregnated with a mixture of a Pt-dinitro-diamine diamine solution and a rhodium nitrate solution. The catalyst mixture was prepared to contain Pt and Rh at a weight ratio of 20:1. The catalyst mixture coating layer which was adjusted to contain Pt and Rh 2.1 g/L in total amount was dried and calcined to from a catalyst inner layer 2. A catalyst outer layer 3 was formed over the catalyst inner layer 2 through the same process as that of each sample catalyst. The catalyst outer layer 3 was 24 g/L. The catalyst inner and outer layers 2 and 3 was impregnated with a barium acetate solution such that they bear 30 g/L Ba and then dried and cacined to complete a comparative catalyst CX.

As summarized in Table I, the comparative catalyst CX differs from the sample catalysts EX-I through EX-IV according to the embodiments of the invention only in that Pt and Rh in the inner layer were not separately carried on different support materials but both Pt and Rh were carried together on the support materials which did not include manganese oxide nor cobalt oxide.

TABLE 1

| | | Carried Amount | EX-I | EX-II | EX-III | EX-IV | CX |
|---|---|---|---|---|---|---|---|
| Inner Layer Catalyst | $MnO_2$ | 12 g/L | Used | None | used | none | None |
| | $Co_2O_3$ | 12 g/L | None | Used | none | none | None |
| | Support Materials for Pt and Rh | | Pt/$Al_2O_3$ + $CeO_2$ | Pt/$Al_2O_3$ + $CeO_2$ | Pt/$Al_2O_3$ + $CeO_2$ + $MnO_2$ | Pt/$Al_2O_3$ + $CeO_2$ | Pt, Rh/$Al_2O_3$ + $CeO_2$ |
| | | | Rh/$MnO_2$ | Rh/$Co_2O_3$ | Rh/$Al_2O_3$ + $CeO_2$ + $MnO_2$ | Rh/$Al_2O_3$ + $CeO_2$ | |

Evaluation tests were made by measuring NOx purification efficiency of the sample catalysts EX-I through EX-IV and comparative catalyst CX. In the evaluation test, each catalyst after heat-aging treatment in the atmosphere for 24 hours at 900° C. was mounted to a fixed-bed-flow type reactor. The catalyst was exposed to a gas simulated as an exhaust gas from the engine operating with a lean air-fuel mixture was flown through the fixed-bed-flow type reactor until showing stable NOx purification efficiency, and subsequently to a gas simulated as an exhaust gas from the engine operating with an enriched air-fuel mixture, which was different in composition from the previously applied simulated gas. At a point of time 130 second after switching again back to the simulated gas having composition corresponding to the lean charge combustion, measurement of NOx purification efficiency was made to determine the lean burn NOx purification performance of the catalyst. The temperature of the catalyst under test and the simulated gas was 350° C. and the simulated gas had composition summarized in TABLE II. The space velocity of simulated gas stream was 25,000 $h^{-1}$.

TABLE II

| | lean-burn condition | fuel-rich condition |
|---|---|---|
| HC ($C_3H_6$) | 4000 ppmC | ← |
| NO | 250 ppm | ← |
| CO | 0.15% | ← |
| $CO_2$ | 10% | ← |
| $H_2$ | 650 ppm | ← |
| $O_2$ | 7% | 0.5% |
| $H_2O$ | 10% | ← |
| $N_2$ | Balance | ← |

Figure 2:
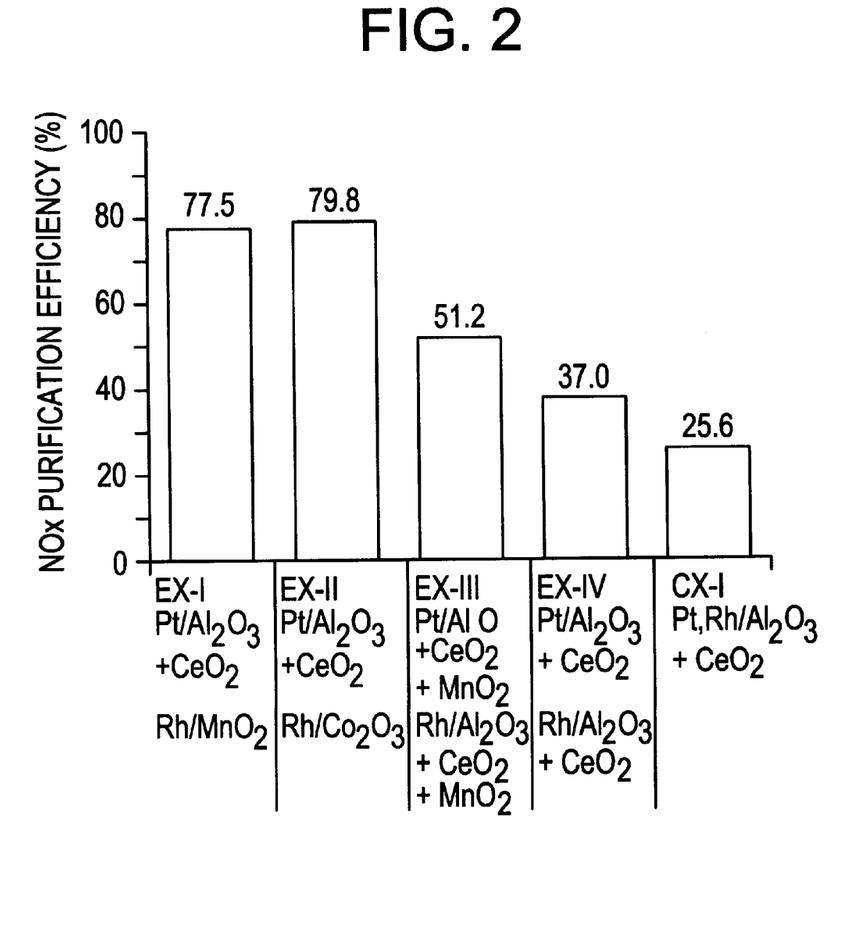
FIG. 2 is a graph of NOx purification efficiency of sample catalysts EX-I–EX-IV of the invention and a comparative catalyst CX-I.

The result of the evaluation tests is shown in FIG. 2.

The NOx purification efficiency is considered to depend upon whether Pt and Rh are separately carried on different support materials, respectively, in the catalyst inner layer or not, and the difference in NOx purification efficiency of sample catalyst EX-IV from comparative catalyst CX is considered to occur due to carrying Pt and Rh in the catalyst inner layer on different support materials. Because, in sample catalyst EX-IV, Pt and Rh are separately carried on their own suppor materials respectively unlike comparative catalyst CX, it is considered that Pt and Rh are prevented from forming an alloy during heat-aging treatment and consequently contribute to NOx purification of the catalyst after heat-aging.

Sample catalysts EX-III and IV are different in whether each of the support materials for Pt and Rh in the catalyst inner layer contains a manganese oxide or not. Therefore, the difference in NOx purification efficiency between sample catalysts EX-III and EX-IV is considered to occur according to whether there is a manganese oxide in their support materials. In sample catalyst EX-III, it is considered that a manganese oxide restrains sintering of alumina while oxidizes NO to $NO_2$ which becomes easier to be adsorbed in NOx adsorbent Ba, and consequently NOx purification efficiency of the sample catalyst EX-III after heat-aging remains kept higher than that of sample catalyst EX-IV.

Sample catalysts EX-I and EX-III are different in whether Pt and Rh are carried by the same type of support materials, and in particular in whether Rh is carried by a manganese oxide as a support material. The difference in NOx purification efficiency of sample catalyst EX-I from the sample catalyst EX-III is considered to carry Rh on a manganese oxide. Since a manganese oxide is hard to be sintered, it is considered that Rh carried on the manganese oxide of sample catalyst EX-I is not buried in manganese oxide particles but remains held on the surfaces of the manganese oxide particles even after heat-aging treatment, which is always desirable for the catalyst to be effective in purifying NOx.

While sample catalyst EX-I is different from sample catalyst EX-I in that it uses a cobalt oxide as a support material for Rh in place of a manganese oxide in sample catalyst EX-I, it has a NOx purification efficiency as high as sample catalyst EX-I. As a result, the cobalt oxide is considered to do almost the same work as the manganese oxide. One of cobalt compounds such as $Co_3O_4$ may be used as the cobalt oxide with the same effect of sample catalyst II.

In order to evaluate the catalyst of the invention with regard to stoichiometric NOx purification efficiency after heat aging treatment as well as lean NOx purification efficiency, sample catalysts EX-V and EX-IV were prepared.

Sample catalyst EX-V was prepared by the same process as the sample catalyst EX-I excepting carrying a half of 2 g/L Pt on a support material of the powdered first catalyst and the remaining of Pt was inpregnated together with Ba in support materials of the first and second catalysts. Specifically, the catalyst inner and outer layers were impregnated with a mixture of a barium acetate solution and a Pt-dinitro-diamine solution and dried and calcined.

Sample catalyst EX-VI was prepared by the same process as the sample catalyst EX-IV excepting carrying a half of 2 g/L Pt on a support material of the powdered first catalyst and the remaining of Pt was inpregnated together with Ba in support materials of the first and second catalysts. Specifically, the catalyst inner and outer layers were impregnated with a mixture of a barium acetate solution and a Pt-dinitro-diamine solution and dried and calcined.

The same evaluation tests were made by measuring lean NOx purification efficiency as well as stoichiometric NOx purification efficiency after heat aging treatment of the sample catalysts EX-V and EX-VI together with EX-I, EX-II and comparative catalyst CX. The result is summarized in Table III.

TABLE III

| | NOx Purification efficiency | |
|---|---|---|
| | Lean | Stoichiometric |
| EX-I | 77.5% | 70.1% |
| EX-II | 79.8% | 70.9% |
| EX-V | 73.1% | 75.8% |
| EX-VI | 45% | 72.8% |
| CX | 25.6% | 81.7% |

Sample catalyst EX-V is different from Sample catalyst I in that a half amount of Pt is impregnated together with Ba. As apparent from Table III, sample catalyst EX-V shows lean NOx purification efficiency lower than sample catalysts EX-I and EX-II, it shows stoichiometric NOx purification efficiency greater the sample catalysts EX-I and EX-II. This is considered that Pt is impregnated with high dispersion in sample catalyst EX-V sufficiently to restrain sintering during heat aging and Pt and Ba particles are dispersed closely to Ba particles to cause enhanced cooperation between Pt, Rh and Ba particles.

Sample catalyst EX-VI is different from sample catalyst EX-IV in that a half amount of Pt is impregnated together with Ba. Sample catalyst EX-VI shows both lean NOx purification efficiency and stoichiometric NOx purification efficiency greater the sample catalysts EX-IV.

In order to evaluate the catalyst of the invention with regard to the difference of NOx purification efficiency before and after heat aging treatment, sample catalysts EX-VII and EX-VIII were prepared.

Sample catalyst EX-VII was prepared by the same process as sample catalyst EX-I excepting that manganese oxide was replaced by titanium oxide ($TiO_2$). Sample catalyst EX-VIII was prepared by the same process as sample catalyst EX-I excepting that manganese oxide was replaced by iron oxide ($Fe_2O_3$). The amount of $TiO_2$ or $Fe_2O_3$ was the same as manganese oxide of sample oxide EX-I.

The same evaluation tests were made by measuring lean NOx purification efficiency under the same conditions. As the result of the tests, sample catalyst EX-VII showed a lean NOx purification efficiency of 65.5%, and sample catalyst EX-VIII showed a lean NOx purification efficiency of 58.8%, which revealed that $TiO_2$ and $Fe_2O_3$ are effective though inferior to manganese oxide and cobalt oxide.

In order to evaluate the usefulness of manganese oxide and cobalt oxide as a support material, a powdered catalyst with Rh carried by $Al_2O_3$, a powdered catalyst with Rh carried by $MnO_2$, and a powdered catalyst with Rh carried by $Co_3O_4$ were prepared. Measurements were made to determine particle sizes of Rh before and after heat aging. The result is summarized in Table IV.
Comparative catalyst CX-I. The result is summarized in Table IV.

TABLE IV

| | Rh particle size | |
|---|---|---|
| | Fresh | After heat aging |
| Rh/$Al_2O_3$ | Smaller than o.o5 nm | 2.0–3.0 nm |
| Rh/$MnO_2$ | 0.13–0.32 nm | 0.12–0.18 nm |
| Rh/$Co_3O_4$ | 0.09–0.64 nm % | 0.28–1.05 nm |

As apparent from Table IV, while Rh carried by $Al_2O_3$ has a small particle size, it is sintered due to heat aging to increase its particle size. As compared with this, Rh carried by $MnO_2$ or $Co_3O_4$ is almost free from sintering. Accordingly, it is understood the utilization of $MnO_2$ or $Co_3O_4$ as a support material is accompanied by an advantage of NOx purification.

Sample Catalyst EX-IX

A mixture of γ-alumina, $CeO_2$—$ZrO_2$ composite oxide, $MnO_2$ and aluminum binder with a weight ratio of 25:25:2:5 was mixed was ion exchanged water to provide a catalyst mixture slurry. The catalyst mixture slurry was wash coated as an inner layer 2 on a honeycomb substrate 1 having a weight 420 g/L. The wash coating was controlled such that the coated and dried catalyst layer had a weight of 342 g/L. The catalyst layer was dried at a temperature between 100 and 200° C. for one hour and calcined at 500 and 600° C. for two hours.

Separately, a mixture of a Pt-dinitro-diamine solution and rhodium nitrate adjusted to contain Pt and Rh with a weight ratio of 75:1 was prepared. The mixture was spray dried together with MFI type zeolite ($SiO_2/Al_2O$) to provide catalyst powder which borne Pt and Rh on the zeolite and was adjusted to have a Pt and Rh content of 2.3 weight %. The catalyst powder and aluminum binder were mixed with a weight ratio of 5:1 and further mixed with ion exchanged water to provide a catalyst mixture slurry. This catalyst mixture slurry was wash coated as an outer catalyst layer 3 over the inner catalyst layer 2 and dried. The coated and dried catalyst layer was adjusted to be 24 g/L. The outer catalyst layer 3 was dried at a temperature between 100 and 200° C. for one hour and calcined at 500 and 600° C. for two hours.

The inner and outer catalyst layers 2 and 3 was impregnated with a mixture of a Pt-dinitrodiamine solution, a rhodium nitrate solution and a barium acetate solution adjusted to contain Pt, Rh and Ba with a weight ratio of 20:1:300. The impregnated amount in weight was 32.1 g/L. The inner and outer catalyst layers 2 and 3 were further dried and calcined to provide a sample catalyst EX-IIIV.

The inner catalyst layer 2 contained 150 g/L γ-alumina, 150 g/L $CeO_2$—$ZrO_2$ composite oxide and 12 g/L $MnO_2$ as a support material, 30 g/L binder, and 2 g/L Pt and 0. 1 g/L Rh as noble metals. The outer catalyst layer 3 contained 20 g/L MFI type zeolite as a support material, 4 g/L binder, and 0.5 g/L Pt and 0.006 g/L Rh as noble materials. The sample catalyst EX-IX contained 30 g/L Ba in total as a NOx adsorbent.

Sample Catalyst EX-X

A sample catalyst EX-X was prepared, which was similar to the sample catalyst IIIV excepting that $MnO_2$ was replaced with $Co_2O_3$.

Comparative Catalyst CX-II

A mixture of γ-alumina, $CeO_2$—$ZrO_2$ composite oxide and aluminum binder with a weight ratio of 5:5:1 was prepared. The mixture was further mixed with ion exchanged water to prepare a catalyst mixture slurry, This catalyst mixture slurry was wash coated as an inner layer 2 on a honeycomb substrate 1 having a weight of 420 g/L and dried. The coated and dried inner catalyst layer 2 was adjusted to be 330 g/L.

Finally, the inner catalyst layer 2 was dried at a temperature between 100 and 200° C. for one hour and calcined at 500 and 600° C. for two hours.

The inner catalyst layer 2 was impregnated with a mixture of a Pt-dinitro-diamine solution and rhodium nitrate solution adjusted to have the Pt and Rh weight ratio of 20:1. The impregnated amount of the mixture was 2.1 g/L. The inner catalyst layer was further dried at a temperature between 100 and 200° C. for one hour and calcined at 500 and 600° C. for two hours.

An outer inner layer 3 just the same as that of the sample catalyst EX-IX was formed over the inner catalyst layer 2 in the same process.

The inner and outer catalyst layers 2 and 3 were impregnated with barium acetate solution. The impregnation was controlled such that the outer and inner catalyst layers 2 and 3 contained 30 g/L Ba.

Comparative Catalyst CX-III

An inner catalyst layer just the same as that of the comparative catalyst CX-II was formed on a honeycomb substrate 1. The coated and dried catalyst layer was adjusted to have a weight of 30 g/L.

An outer catalyst layer 3 just the same as that of the sample catalyst EX-IX was formed over the inner catalyst layer 2. The coated and dried catalyst layer was adjusted to have a weight of 24 g/L.

The inner and outer catalyst layers 2 and 3 were impregnated with Pt, Rh and Ba of 32.1 g/L in total weigh in the same process for the sample catalyst EX-IX.

Comparative Catalyst CX-IV

An inner catalyst layer 2 was formed on a honeycomb substrate 1 in the same process for the sample catalyst EX-IIIV. The coated and dried catalyst layer was adjusted to be 342 g/L. The inner catalyst layer 2 was impregnated with a mixture of a Pt-dinitro-diamine solution and rhodium nitrate solution adjusted to have the Pt and Rh weight ratio of 20:1 in the same process as that for the comparative catalyst CX-II, The impregnated amount of Pt and Rh was 2.1 g/L.

An outer catalyst layer 3 just the same as that of the sample catalyst EX-IX was formed over the inner catalyst layer 2 in the same process for the sample catalyst XE-IX. The coated and dried catalyst layer was adjusted to be 24 g/L.

The inner and outer catalyst layers 2 and 3 were impregnated with a barium acetate solution. The impregnation was controlled such that the inner and outer catalyst layers 2 and 3 contained 30 g/L Ba.

The sample catalysts EX-IX and X and the comparative catalysts CX-II–CX-IV are summarized in Table V.

TABLE V

| | Comparative Catalyst | | | Sample Catalyst | |
|---|---|---|---|---|---|
| | CX-II | CX-III | CX-IV | EX-IX | EX-X |
| Amount of $MnO_2$ | — | — | 12 g/L | 12 g/L | — |
| Amount of $Co_2O_3$ | — | — | — | — | 12 g/L |
| Ba Impregnation | After Pt, Rh | With Pt, Rh | After Pt, Rh | With Pt, Rh | With Pt, Rh |

Figure 3:
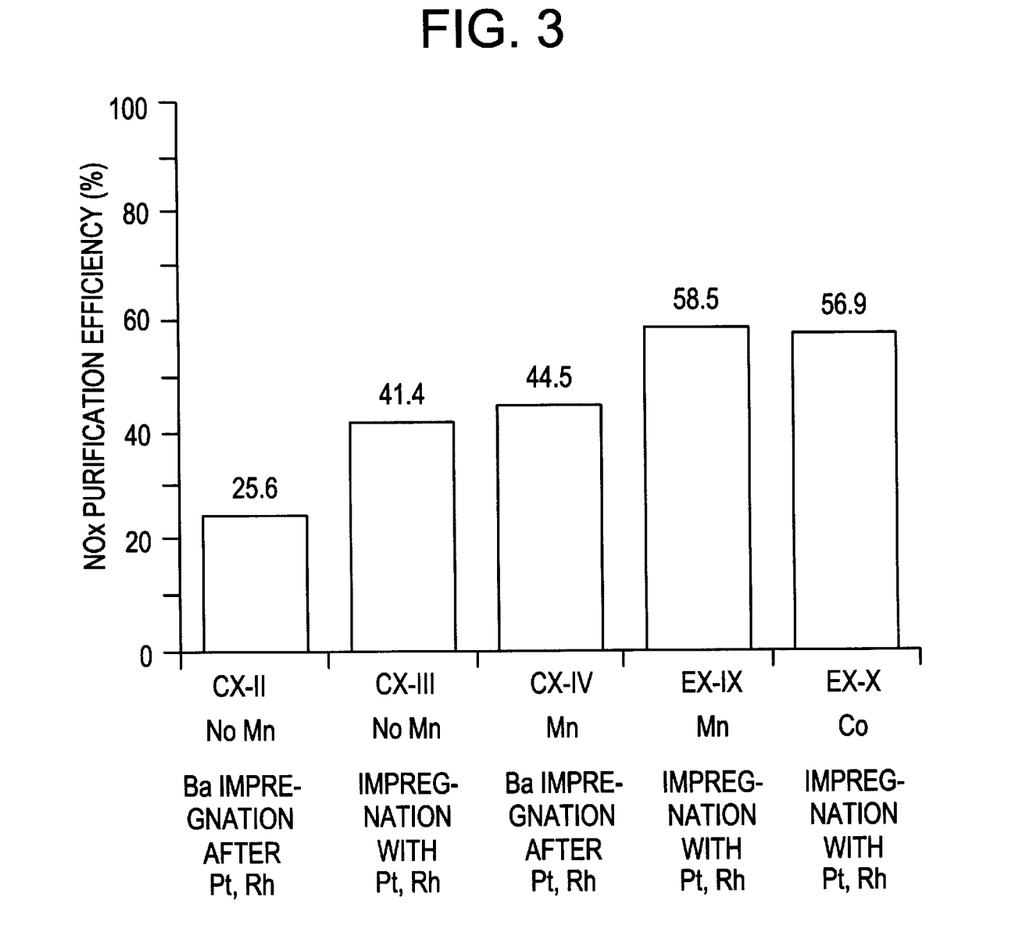
FIG. 3 is a graph of NOx purification efficiency of sample catalysts EX-IX and EX-X of the invention and a comparative catalysts CX-II–CX-IV.

Evaluation tests were made by measuring NOx purification efficiency in the same manner as described previously and the simulated gas as used in these tests had composition summarized in Table II. The result of the evaluation tests is shown in FIG. 3.

The difference between comparative catalysts CX-II and CX-III is only whether Ba is impregnated after Pt and Rh or together with Pt and Rh. The NOx purification efficiency difference (15.5%) between the two is considered to result from impregnation of Ba together with Pt and Rh. The difference between comparative catalysts CX-II and CX-IV is only whether a manganese oxide is contained or not. The NOx purification efficiency difference between the two is considered to be an effect of a manganese oxide additive. The sample catalyst EX-IX that contains a manganese oxide and is impregnated with Ba together with Pt and Rh shows an NOx purification efficiency greater than the comparative catalysts CX-III and CX-IV and, in particular, significantly greater than comparative catalyst CX-II by 33.9%. An increase in NOx purification efficiency is 15.5% resulting from the addition of a manganese oxide (comparative catalyst CX-III) and an increase in NOx purification efficiency resulting from the impregnation of Ba together with Pt and Rh is 18.9%. Accordingly, a total increase in NOx purification efficiency of 34.4% is expected for a catalyst that contains a manganese oxide and impregnated with Ba together with Pt and Rh. The sample catalyst EX-IX shows a NOx purification efficiency which is comparable with the total increase due to a manganese oxide additive and simultaneous impregnation of Ba, Pt and Rh.

Generally, a catalyst shows saturation of an increase in NOx purification efficiency as the noble metal content of the catalyst increases and becomes hard to provide an increase in NOx purification efficiency as its NOx purification efficiency becomes higher. In light of the fact, as was described above, it can be said that the combination of a manganese oxide additive and Ba impregnation together with Pt and Rh provides the mutual potentiating effect of them.

Sample catalyst EX-X shows a NOx purification efficiency as high as the sample catalyst EX-IV. This indicates that a cobalt oxide additive in combination of Ba impregnation together with Pt and Rh is effective to provide an increase in NOx purification efficiency as large as a manganese oxide additive in combination with Ba impregnation together with Pt and Rh. Table VI shows the effect of metal oxide additives to NOx purification efficiency. The catalysts have the same composition excepting the kind of metal oxide. As apparent in Table VI, $TiO_2$ is effective to improve NOx purification efficiency. Even $Fe_2O_3$ is more effective to improve NOx purification efficiency as compared with comparative catalyst CX-III.

TABLE VI

| Catalyst | Metal Oxide | NOx Purification Efficiency (%) |
| --- | --- | --- |
| Catalyst - 1 | $MnO_2$ | 55.5% |
| Catalyst - 2 | $Co_2O_3$ | 56.9% |
| Catalyst - 3 | $TiO_2$ | 49.0% |
| Catalyst - 4 | $Fe_2O_3$ | 41.9% |
| Comparative | NiO | 38.0% |

In light of the above evaluation, a combination of bearing NOx adsorbent such as Ba on a support material by impregnating it together catalytic noble metals and containing a specific metal oxide as a catalytic component is advantageous to improvement of NOx purification efficiency of the catalyst after exposure to high temperature exhaust gases,.

It is easily understood that the invention is useful and not limited to the double layered catalyst exemplified above but can be applied to other types of catalyst such as single layered catalysts and pellet type catalysts with the same effect.

What is claimed is:

1. A method of manufacturing an exhaust gas purifying catalyst, which comprises the steps of:
   preparing a powdered first catalyst carrying Pt on a mixture of $Al_2O_3$ and $CeO_2$, but not containing Rh;
   preparing a powdered second catalyst carrying Rh on at least one metal oxide selected from a group consisting of oxides of Mn, Co, Ti, and Fe, but not containing Pt;
   preparing a powdered third catalyst carrying Pt and Rh on a zeolite,
   coating a mixture of said powdered first catalyst and said powdered second catalyst as a catalyst inner layer on a substrate;
   coating said powered third catalyst over said catalyst inner layer as a catalyst outer layer on said substrate; and
   impregnating said catalyst inner and outer layers with a solution of NOx adsorbent comprising at least one of metals selected from a group consisting of alkaline metals, alkali earth metals, and rare earth metals, which is operative to adsorb NOx in an exhaust gas from an engine to carry said NOx adsorbent in said catalyst inner and outer layers.

2. An exhaust gas purifying catalyst having a catalyst layer on a substrate which contains NOx adsorbent operative to adsorb NOx in an exhaust gas from an engine, wherein said catalyst layer comprising:
   a catalyst inner layer formed on said substrate, wherein said catalyst inner layer comprising a catalytic component which carries Pt and said NOx adsorbent on a mixture of $Al_2O_3$ and $CeO_2$, but does not contain Rh, and a catalyst component which carries Rh and said NOx adsorbent on at least one metal oxides selected from a group consisting of oxides of Mn, Co, Ti, and Fe, but does not contain Pt; and
   a catalyst outer layer formed over said catalyst inner layer, wherein said catalyst outer layer comprising a catalytic component which carries Pt, Rh, and said NOx adsorbent on a zeolite.

3. A method of manufacturing an exhaust gas purifying catalyst which contains NOx adsorbent operative to adsorb NOx in an exhaust gas from a lean burn engine while an oxygen concentration of said exhaust gas is high and desorb said NOx when said oxygen concentration becomes low and a first noble metal Pt and a second noble metal Rh both of which are operative to catalyze reduction of the NOx, said exhaust gas purifying catalyst manufacturing method comprising the steps of:
   preparing a powdered first catalyst containing said first noble metal Pt on a support material, but not containing said second noble metal Rh;
   preparing a powdered second catalyst carrying said second noble metal Rh on a support material, but not containing said first noble metal Pt;
   providing a mixture of said powdered first catalyst and said powdered second catalyst;
   forming an inner layer of said mixture; and
   impregnating said mixture with a solution of NOx adsorbent together with a solution of said first noble metal Pt to carry said NOx adsorbent and said first noble metal Pt additionally on said support materials so that said NOx adsorbent is laid between first catalyst and said second catalyst.

4. A method of manufacturing an exhaust gas purifying catalyst as defined in claim 3, wherein said NOx adsorbent comprises at least one of metals selected from a group consisting of alkaline metals, alkali earth metals, and rare earth metals.

5. A method of manufacturing an exhaust gas purifying catalyst as defined in claim 3, wherein said support material of said first catalyst comprises at least one of $Al_2O_3$ and $CeO_2$, and said support material of said second catalyst comprises at least one metal oxide selected from a group consisting of oxides of Mn, Co, Ti, and Fe.

6. A method of manufacturing an exhaust gas purifying catalyst as defined in claim 3, wherein said support materials comprises at least one of $Al_2O_3$, $CeO_2$, and oxides of Mn, Co, Ti, and Fe.

7. A method of manufacturing an exhaust gas purifying catalyst as defined in claim 3, wherein said support material of said second catalyst has a specific surface area greater than said support material of said first catalyst and has a second noble metal content per unit mass less than a first noble metal content per unit mass of said support material of said first catalyst.

8. A method of manufacturing an exhaust gas purifying catalyst as defined in claim 3, wherein said support material of said second catalyst comprises an oxide operative to oxide NOx in said exhaust gas from said lean burn engine.

9. A method of manufacturing an exhaust gas purifying catalyst which contains NOx adsorbent operative to adsorb NOx in an exhaust gas from a lean burn engine while the oxygen concentration of said exhaust gas is higher than 4% and desorb said NOx when said oxygen concentration becomes low and a noble metal operative to catalyze reduction of NOx in the exhaust gas, said exhaust gas purifying catalyst manufacturing method comprising the steps of:

preparing a solution of NOx adsorbent;

preparing a solution of a noble metal;

impregnating at least one metal oxide selected from a group consisting of oxides of Mn, Co, Ti, and Fe, which are capable of oxidizing and converting NO in the exhaust gas to $NO_2$ when said oxygen concentration is high, with a solution mixture of said solution of said NOx adsorbent and said solution of said noble metal to carry said NOx adsorbent and said noble metal on said metal oxide so as to support said NOx adsorbent and said noble metal with high dispersion;

forming an inner layer of a mixture of said selected one of said metal oxide a mixture of $Al_2O_3$ and $CeO_2$ on a substrate;

forming an outer layer of zeolite over said inner layer; and impregnating said inner layer and said outer layer with said solution mixture of a solution of at least one of metals selected from a group consisting of alkaline metals, alkali earth metals, and rare earth metals as said NOx adsorbent and a solution of said noble metal to carry said NOx adsorbent and said noble metal in said inner layer and said outer layer.

10. An exhaust gas purifying catalyst having a catalyst layer on a substrate which contains NOx adsorbent operative to adsorb NOx in an exhaust gas from a lean burn engine while an oxygen concentration of said exhaust gas is high and desorb said NOx when said oxygen concentration becomes low and a first noble metal Pt and a second noble metal Rh both of which are operative to catalyze reduction the NOx, said catalyst layer comprising:

a mixture of a first support material carrying said first noble metal Pt and said NOx adsorbent but not containing said second noble metal Rh, and a second support material carrying said second noble metal Rh and said adsorbent, but not containing said first noble metal Pt;

wherein said second support material is different from said first support material in which it has a specific surface area greater than said first support material and has a second noble metal content per unit mass less than a first noble metal content of said first support material per unit, and wherein said first and second support materials support said NOx adsorbent partly such that both a particle of said support material carrying said first noble metal Pt and a particle of said support material carrying said second noble metal Rh jointly support a particle of said NOx adsorbent.

11. An exhaust gas purifying catalyst as defined in claim 10, wherein said NOx adsorbent comprises at least one of metals selected from a group consisting of alkaline metals, alkali earth metals, and rare earth metals.

* * * * *